(12) United States Patent
Morita

(10) Patent No.: US 10,574,838 B2
(45) Date of Patent: Feb. 25, 2020

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Hiroyasu Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/142,122

(22) Filed: Sep. 26, 2018

(65) Prior Publication Data
US 2019/0104219 A1  Apr. 4, 2019

(30) Foreign Application Priority Data
Oct. 3, 2017 (JP) .................. 2017-193821

(51) Int. Cl.
| H04N 1/00 | (2006.01) |
| H04N 1/32 | (2006.01) |
| H04N 1/44 | (2006.01) |
| H04N 1/333 | (2006.01) |

(52) U.S. Cl.
CPC ....... *H04N 1/0022* (2013.01); *H04N 1/00482* (2013.01); *H04N 1/32037* (2013.01); *H04N 1/33369* (2013.01); *H04N 1/4433* (2013.01); *H04N 2201/0094* (2013.01)

(58) Field of Classification Search
CPC ............. H04N 1/0022; H04N 1/33369; H04N 1/00482; H04N 1/32037; H04N 1/4433; H04N 2201/0094

USPC ....................................................... 358/1.15
See application file for complete search history.

(56) References Cited

U.S. PATENT DOCUMENTS

| 7,221,469 | B2 | 5/2007 | Morita | |
| 9,563,391 | B2 | 2/2017 | Morita | |
| 9,860,231 | B2 * | 1/2018 | Miyazawa | .............. H04L 63/08 |
| 2005/0141044 | A1 | 6/2005 | Morita | |
| 2006/0190496 | A1 * | 8/2006 | Tsunoda | ............. H04N 1/00477 |
| 2008/0043282 | A1 * | 2/2008 | Tsuboi | ............... H04N 1/00204 |
| | | | | 358/1.15 |
| 2017/0118373 | A1 | 4/2017 | Morita | |
| 2018/0048803 | A1 | 2/2018 | Morita | |

FOREIGN PATENT DOCUMENTS

| JP | 2009177763 A | 8/2009 |
| JP | 2015005949 A | 1/2015 |

* cited by examiner

*Primary Examiner* — Tammy Paige Goddard
*Assistant Examiner* — Darryl V Dottin
(74) *Attorney, Agent, or Firm* — Venable LLP

(57) ABSTRACT

In accordance with an authenticated user designating a destination linked to self as a transmission destination, the transmission destination is set, and a transmission setting including the set transmission destination is registered together with first information indicating that the transmission destination was designated by designation of the destination linked to self. Also, in a case where another user is authenticated, and in accordance with a read instruction for the registered transmission setting, the transmission setting that is the target of the read instruction was registered together with the first information, as a transmission destination of the transmission setting a destination linked to the another user, who performed the read instruction, is set.

19 Claims, 12 Drawing Sheets

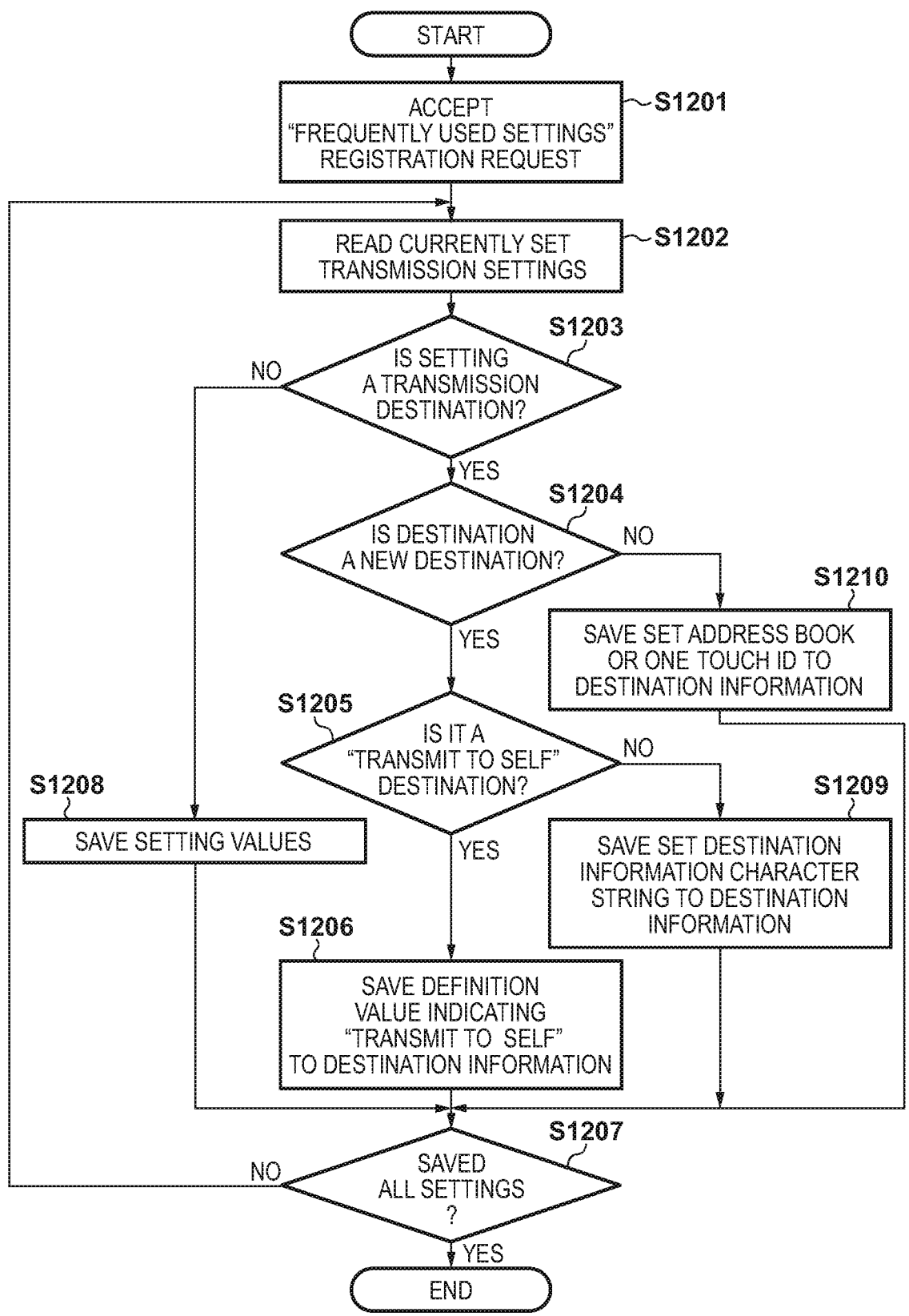

FIG. 13A

```
<AEI id="EMAIL_LIST">
    <Idx id="0">                                                    1301
        <Alt id="DESTINATION_ADDESS" Ext="ENT">USER_MAIL_ADDRESS</Alt>
        <Alt id="EMAIL_INDEX">0</Alt>
        <Alt id="DB_TYPE">DIRECT_INPUT</Alt>  ~1302
        <Alt id="DB_INDEX">0</Alt>
        <Alt id="ADDRESS_NAME" Ext="ENT"/>
        <Alt id="ADDRESS_PHONETIC" Ext="ENT"/>
        <Alt id="ADDRESS_TYPE">ADDRESS_TYPE_TO</Alt>
    < Idx>
< AEI>
```

FIG. 13B

```
<AEI id="EMAIL_LIST">
    <Idx id="0">                                                    1303
        <Alt id="DESTINATION_ADDESS" Ext="ENT">User A@mail.com</Alt>
        <Alt id="EMAIL_INDEX">0</Alt>
        <Alt id="DB_TYPE">DIRECT_INPUT</Alt>  ~1304
        <Alt id="DB_INDEX">0</Alt>
        <Alt id="ADDRESS_NAME" Ext="ENT"/>
        <Alt id="ADDRESS_PHONETIC" Ext="ENT"/>
        <Alt id="ADDRESS_TYPE">ADDRESS_TYPE_TO</Alt>
    < Idx>
< AEI>
```

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

A facsimile number of a business contact to whom a bill is to be transmitted and an intracompany shared server that saves documents for information sharing are examples of destinations to which a user transmits an original by using a multi-function peripheral. Also, there are cases in which "self as destination", which is easily used by the user himself or herself, is designated as the transmission destination for a user's individual work. This "self as destination" may be an email address of the user himself or herself or a folder on a file server that is assigned to the respective user, for example.

So that a user can easily designate such a destination linked to the user, a dedicated button for designating a folder destination that is assigned to the user or an email address of the user himself or herself is displayed on the screen. When the user presses this button at the time of, for example, a scan transmission or the like, the MFP obtains the email address or the folder destination linked to the user, and sets the transmission destination automatically.

Meanwhile, there is a function in which, by enabling a transmission setting that is necessary for transmitting an original, such as a transmission destination or a setting for when scanning an original, to be saved in the device and read as necessary, a user can set a transmission setting that they frequently use with a simple operation, and operability is improved. Such a function is realized as a mode memory function that has the title "frequently-used settings" or "custom menu" or the like. For such a mode memory function, even in a case in which a destination is designated by the user by a button such as "transmit an email to self", "my folder" or the like, similarly to a case in which a destination is designated from an address book, the designated destination and the current transmission settings can be saved and read out.

Because such an MFP is used by multiple users, there are cases in which transmission settings that are frequently used are provided so as to be shared by multiple users. For example, in an MFP of a particular department, specification of a predetermined resolution or file format as a shared transmission setting for when digitizing an original by using a file transmission function of the MFP can be considered. In such a case, when users each register transmission settings for their own respective destinations, mode memory of a size proportional to the number of users becomes necessary, and there is the possibility that an upper limit on the number of transmission settings that can be registered will be reached. Also, even if, hypothetically, it is possible for each user to register a transmission setting for their respective destination, there is the possibility that there will end up being multiple similar transmission settings, and it will become difficult for a user to select a desired transmission setting. For example, in Japanese Patent Laid-Open No. 2015-005949 is described control for a case in which, when a transmission setting registered in a mode memory is called, a transmission destination registered in the transmission setting and a destination of the user that is authenticated are different from each other and an available destination is restricted to the destination of the user that is authenticated. An image processing apparatus that, in such a case, rewrites the transmission destination to the destination of the authenticated user rather than the registered transmission destination is described.

Also, in Japanese Patent Laid-Open No. 2009-177763, it is described that in an image processing apparatus having functions for registering a plurality of different processes as a processing sequence and executing image data processing, when a registered processing sequence is called, some processes are replaced with user-specific processes before execution.

In Japanese Patent Laid-Open No. 2015-005949, in a case where destinations to which transmission is possible are limited to the destination of the user, the mode memory destination that is called is rewritten with the destination of the user. However, it is not necessarily the case that destinations to which transmission is possible are limited to the destination of the user for requests that intend to make the transmission destination be a destination linked to the user that made the call. Also, in Japanese Patent Laid-Open No. 2009-177763, the part of a processing sequence in which different processes are registered as a sequence of processes is replaced with user-specific processing in accordance with a condition. However, there are requests in which it is intended that some settings, such as the transmission destination, be made to be the destination of the user who made the call, even during a single process such as email transmission or file transmission. Also, there is the possibility that the designation of replacement with user-specific processing included in a registered processing sequence will not reflect the explicit intention of the user.

SUMMARY OF THE INVENTION

An aspect of the present invention is to eliminate the above-mentioned problem with conventional technology.

A feature of the present invention is to provide a technique in which users can use transmission settings that can be shared, and can transmit to different transmission destinations for each user by using the transmission settings.

According to a first aspect of the present invention, there is provided a communication apparatus, comprising: a memory device that stores a set of instructions; and at least one processor that executes the instructions stored in the memory to: authenticate a user; in accordance with the authenticated user designating a destination linked to self as a transmission destination, set the transmission destination; register a transmission setting including the set transmission destination together with first information indicating that the transmission destination was designated by designation of the destination linked to self; and in a case where another user is authenticated and, in accordance with a read instruction for the registered transmission setting, the transmission setting that is the target of the read instruction was registered together with the first information, set as a transmission destination of the transmission setting a destination linked to the another user, who performed the read instruction.

According to a second aspect of the present invention, there is provided a communication apparatus, the communication apparatus comprising: a memory device that stores a set of instructions; and at least one processor that executes the instructions stored in the memory to: authenticate a user;

designate a notification destination to which to notify a result of an executed job; in accordance with the authenticated user designating a destination linked to self as the notification destination, set the notification destination; register a notification setting including the set notification destination together with first information indicating that the notification destination was designated by designation of the destination linked to self; and in accordance with a read instruction for the registered notification setting, change the notification destination of the notification setting to a destination linked to the user that made the read instruction.

According to a third aspect of the present invention, there is provided a method of controlling a communication apparatus, the method comprising: authenticating a user; in accordance with the authenticated user designating a destination linked to self as a transmission destination, setting the transmission destination; registering a transmission setting including the set transmission destination together with first information indicating that the transmission destination was designated by designation of the destination linked to self; and in a case where another user is authenticated and, in accordance with a read instruction for the registered transmission setting, the transmission setting that is the target of the read instruction was registered together with the first information, setting as a transmission destination of the transmission setting a destination linked to the another user, who performed the read instruction.

According to a fourth aspect of the present invention, there is provided a method of controlling a communication apparatus, the method comprising: authenticating a user; designating a notification destination to which to notify a result of an executed job; in accordance with the authenticated user designating a destination linked to self as the notification destination, setting the notification destination; registering a notification setting including the set notification destination together with first information indicating that the notification destination was designated by designation of the destination linked to self; and in a case where another user is authenticated and in accordance with a read instruction for the registered notification setting, the notification setting that is the target of the read instruction was registered together with the first information, setting as the notification destination of the notification setting a destination linked to the another user, who performed the read instruction.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart for describing processing of the multi-function peripheral for when a user registers transmission settings, which are set at that point in time, as "frequently-used settings" in the multi-function peripheral according to the first embodiment.

FIGS. 13A and 13B depict views for describing examples of destination information which is registered as "frequently-used settings" in the multi-function peripheral according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
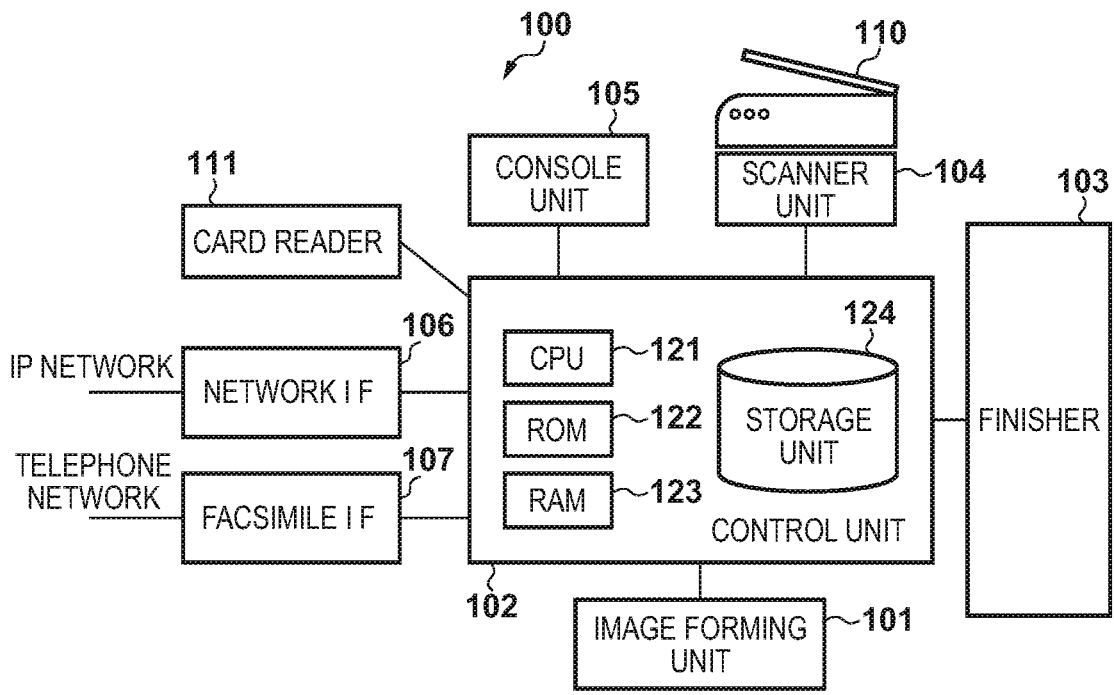
FIG. 1 is a block diagram for describing an overview configuration of an MFP according to a first embodiment of the present invention.

FIG. 1 is a block diagram for describing an overview configuration of a multi-function peripheral (MFP) 100 according to a first embodiment of the present invention. Note that in the embodiments described below, a communication apparatus according to the present invention is described using the example of the multi-function peripheral (MFP) 100, but that the communication apparatus according to the present invention is not limited to a multi-function peripheral, and may be applied to a communication apparatus such as an information processing apparatus such as a PC, a facsimile machine, or the like.

The multi-function peripheral 100 comprises an image forming unit 101 that forms an image on a sheet by a printing method such as electrophotography and a control unit 102 that controls operation of the multi-function peripheral 100 as a whole. Also, a finisher 103 that performs post-processing such as stapling processing, a scanner unit 104 that scans an original placed on an original platen, and a console unit 105 that inputs various data and commands are comprised. Also, a network interface (I/F) 106 for transmission/reception of image data or the like via a network and a facsimile I/F 107 for transmission/reception of fax data are comprised. Additionally, an auto document feeder 110 that scans an image while sequentially feeding a plurality of originals and a card reader 111 that performs a user authentication of a user that uses a device are comprised. Also, these are respectively connected to the control unit 102 by dedicated interfaces.

The control unit 102 has a central processing unit (CPU) 121 and a storage unit (memory) 124 such as a ROM 122, a RAM 123, and an HDD. In the storage unit 124, control programs corresponding to the flowcharts of FIGS. 11, 12, 14, 16 and 17 are stored. Also, control programs for displaying the screens illustrated in FIGS. 4 to 9 and FIG. 15 and content in which screen information is described are stored therein. The CPU 121, when the power is turned on, executes a boot program stored in the ROM 122, deploys a program stored in the storage unit 124 into the RAM 123, and by executing the deployed program, controls operation of the multi-function peripheral 100.

Figure 2:
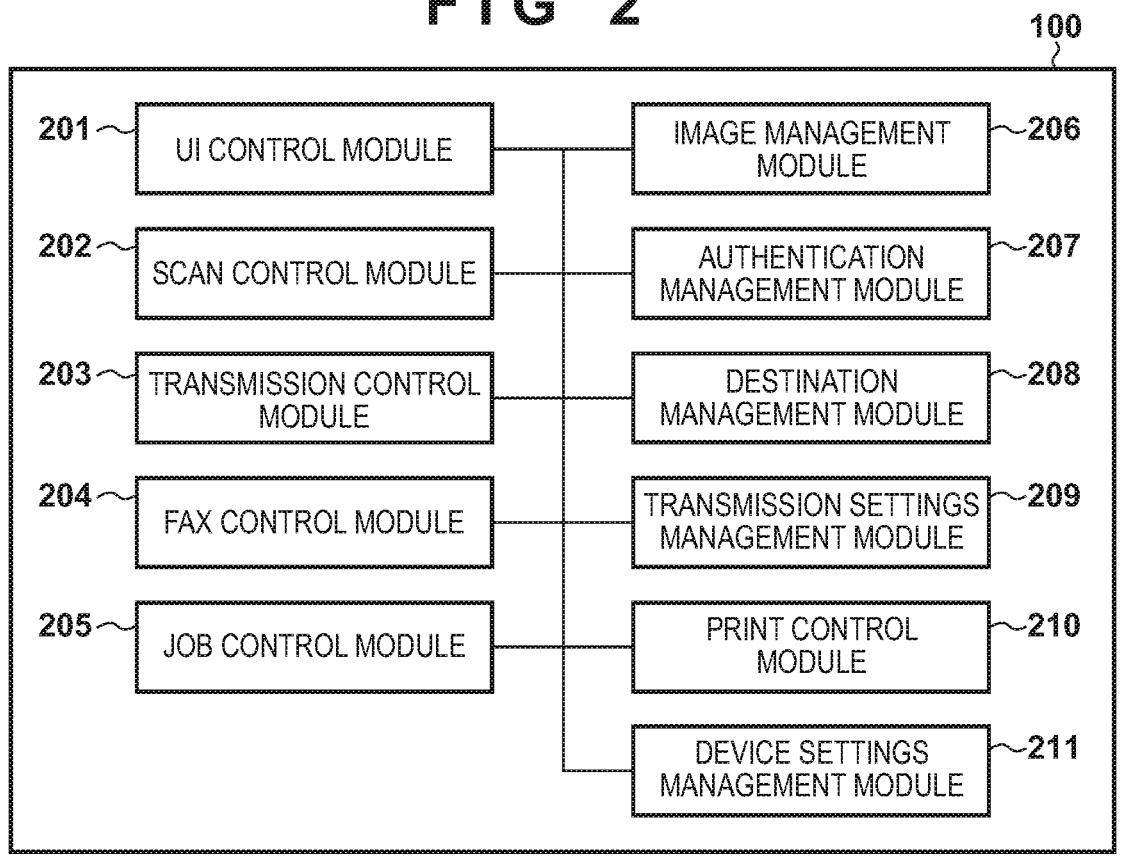
FIG. 2 is a functional block diagram for describing a software configuration of the multi-function peripheral according to the first embodiment.

FIG. 2 is a functional block diagram for describing a software configuration of the multi-function peripheral 100 according to the first embodiment. Note that functions of each unit illustrated in this functional block diagram are achieved by the CPU 121 executing a program deployed into the RAM 123 as described above.

A UI control module 201 displays an operation screen on the console unit 105, and controls a user interface (UI) that accepts operations from a user. A scan control module 202 controls the scanner unit 104 and the feeder 110, and controls processing for scanning an image of an original. A transmission control module 203 controls processing for using the network I/F 106 to transmit image data that the scan control module 202 scanned to a destination that the user designated. More specifically, the transmission control module 203 controls a transmission of the electronic mail, a transmission to a file server, or the like. A fax control module 204 the FAX controls transmission/reception of a G3 fax by using the facsimile I/F 107. A job control module 205 manages transmission requests from a user that the UI control module 201 accepted and execution statuses and history thereof. An image management module 206 manages management information for image data obtained by scanning with the scanner unit 104. An authentication management module 207, based on information scanned by the card reader 111 or information inputted by a user on the console unit 105, identifies the user who is using the multi-function peripheral 100 and manages information related to the identified user. A destination management module 208 manages transmission destination information of transmission partner destinations that are used in transmission processing. A transmission settings management module 209 manages transmission settings saved in the multi-function peripheral 100 or read out from the multi-function peripheral 100 upon an instruction by a user. A print control module 210 controls printing to a sheet of image data obtained by the scanner unit 104 scanning an original, a received print job, a fax document, a transmission result report or the like, by using the image forming unit 101. A device settings management module 211 saves and manages various settings corresponding to the multi-function peripheral 100.

Figure 3:
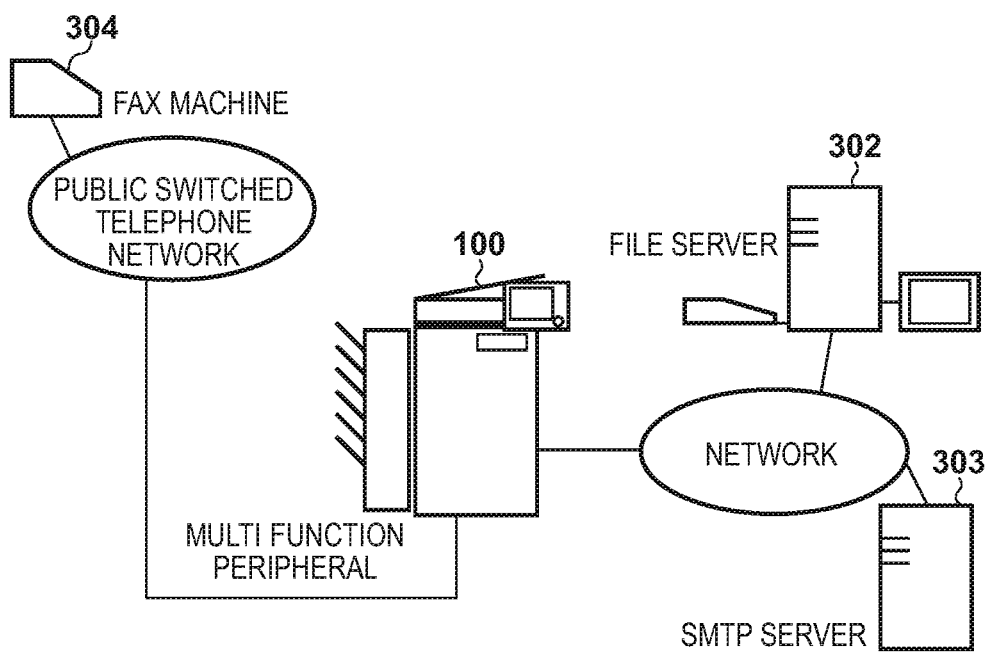
FIG. 3 depicts a view illustrating a configuration of a communication system which includes the multi-function peripheral according to the first embodiment.

FIG. 3 depicts a view illustrating a configuration of a communication system which includes the multi-function peripheral 100 according to the first embodiment.

A file server 302 is a server that is a transmission destination when a network scan is executed in the multi-function peripheral 100. An SMTP server 303 is a server used in electronic mail transmission, and is connected via a network to the multi-function peripheral 100. A G3 fax machine 304 is a fax machine that is connected with the multi-function peripheral 100 via a public switched telephone network.

A user of the multi-function peripheral 100 can transmit image data, files, and the like to a desired destination by designating a transmission destination from a later-described operation screen of the multi-function peripheral 100 and detailed settings at the time of transmission.

Figure 4:
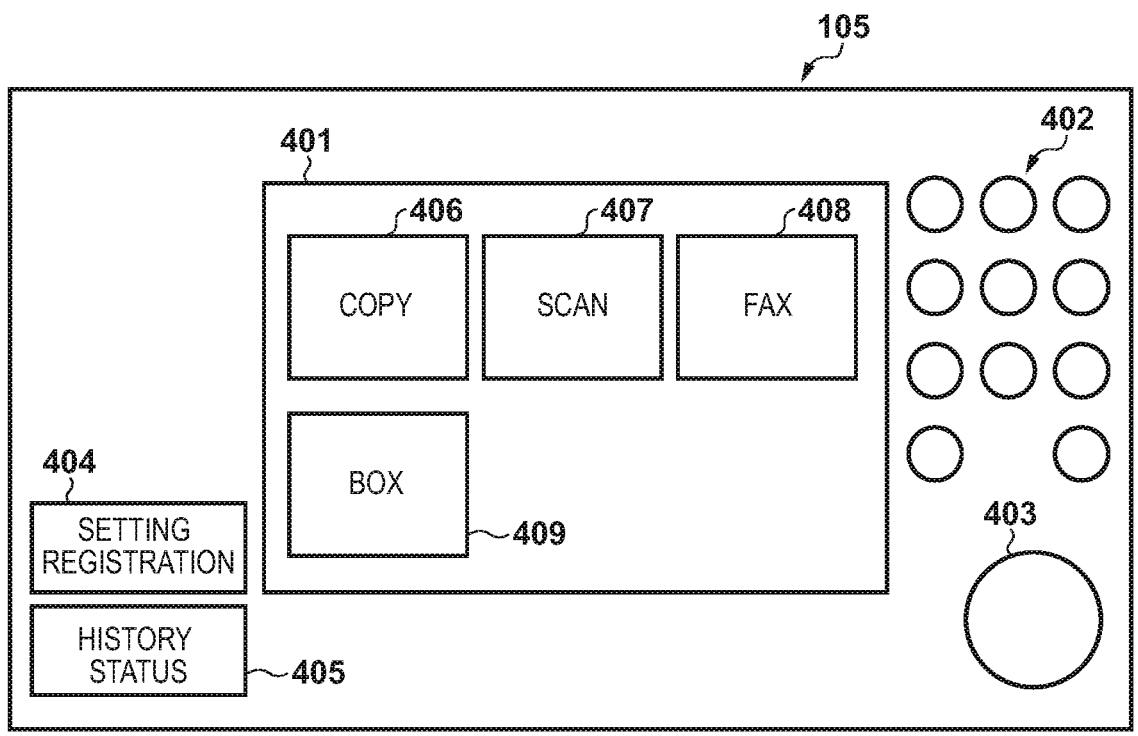
FIG. 4 depicts a top view of a console unit of the multi-function peripheral according to the first embodiment.

FIG. 4 depicts a top view of the console unit 105 of the multi-function peripheral 100 according to the first embodiment. Here, a state in which a menu screen is displayed is illustrated.

A display unit 401 has a touch panel function, and displays messages to the user, icons and buttons corresponding to various functions, and the like. In this menu screen, a "copy" button 406, a "scan" button 407, a "fax" button 408, and a "box" button 409, which are for calling operation screens for a copy function, a network scan function, a fax function, and a box function, are displayed. Also, on the console unit 105, a numeric keypad 402 and a start key 403 for instructing the start of a job are arranged. Furthermore, a "setting-registration" button 404 for calling a setting screen of the multi-function peripheral 100 and a "history-status" button 405 for calling a job history-status screen are arranged.

Figure 5:
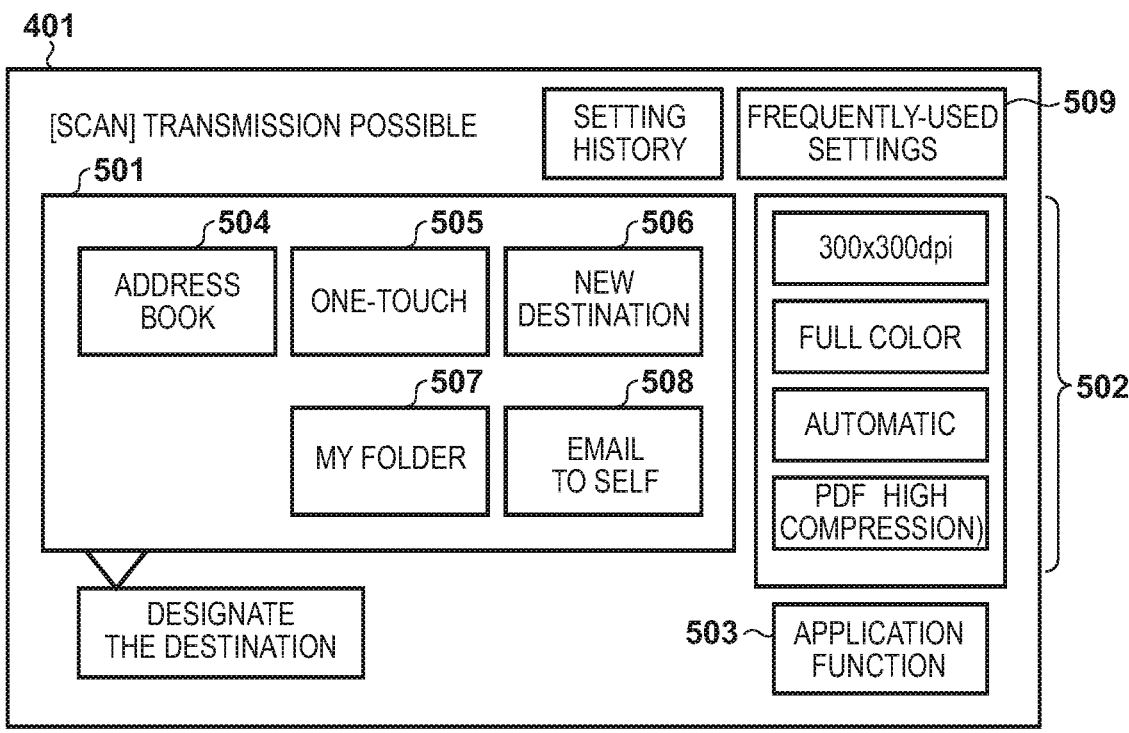
FIG. 5 depicts a view illustrating an example of a scan operation screen which is displayed in a display unit of the console unit when a user presses a "scan" button in FIG. 4.

FIG. 5 depicts a view illustrating an example of a scan operation screen which is displayed on the display unit 401 of the console unit 105 when a user presses the "scan" button 407 in FIG. 4.

Figure 6:
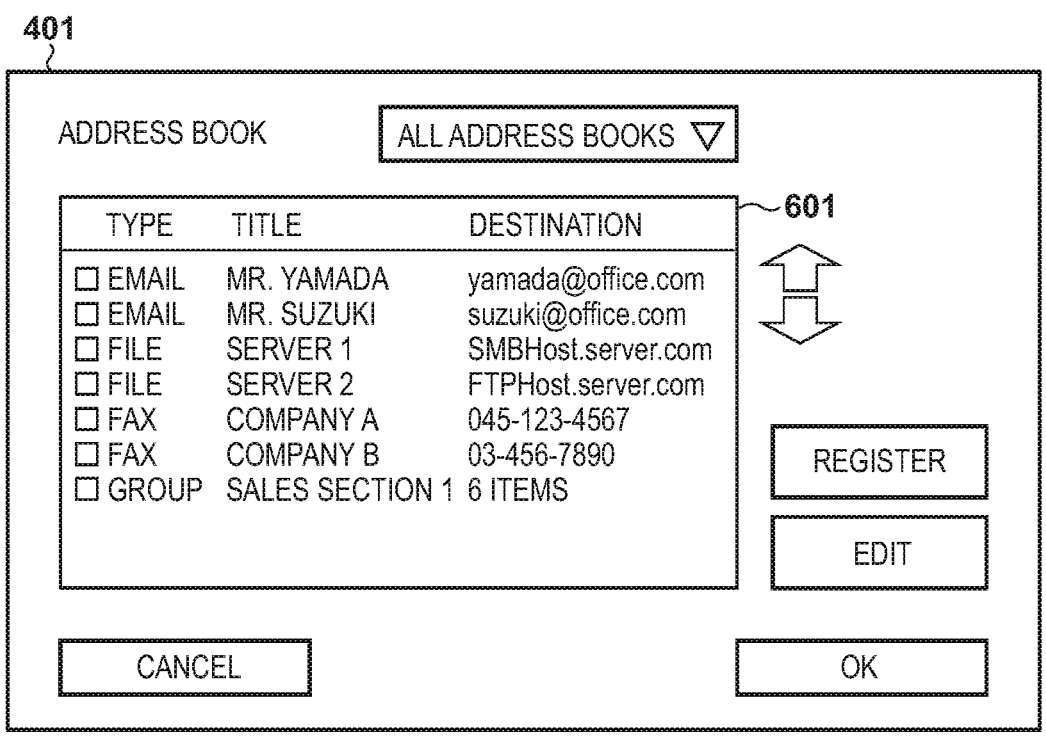
FIG. 6 depicts a view illustrating an example of an address book screen which is displayed in the display unit of the console unit when a user presses an "address book" button in FIG. 5.

A destination specifying area 501 includes a plurality of destination input buttons that a user can press to designate a transmission destination. When the user presses an "address book" button 504, an address book screen of FIG. 6 is displayed, for example, and from that address book, a user can select a desired destination and designate the destination as a transmission destination. Also, when a user presses a "one-touch" button 505, a one-touch button selection screen (not shown) is displayed, and the user can designate, as a transmission destination, a destination registered for a onetouch button selected on that screen. Also, when a user presses a "new destination" button 506, a transmission type selection screen (not shown) is displayed, and a destination setting screen (not shown) according to the transmission type that the user selected is displayed. Then the user, by inputting information required for each transmission type, can designate the transmission destination.

Also, when the user presses a "my folder" button 507, a destination of a file server folder that is linked to the user is designated as a transmission destination. Also, when the user presses an "email to self" button 508, an email address that is linked to the user is designated as a transmission destination. In this way, the transmission destination for image data obtained by scanning can be designated by any of these methods.

Buttons 502 are basic setting buttons for setting scan conditions such as a scan resolution, a scan color mode, or the like and a transmission file format. An application function button 503 is a button that calls various detailed settings for scanning and transmission. A "frequently-used settings" button 509 is a button for calling a "frequently-used settings" screen that displays buttons corresponding to saved transmission settings.

FIG. 6 depicts a view illustrating an example of an address book screen which is displayed on the display unit 401 of the console unit 105 when a user presses the "address book" button 504 in FIG. 5.

The user can select a desired destination from a destination list 601 displayed on this screen and set the selected destination to the transmission destination. The transmission destination selected here is saved in the storage unit 124 and managed by the destination management module 208.

Figure 7:
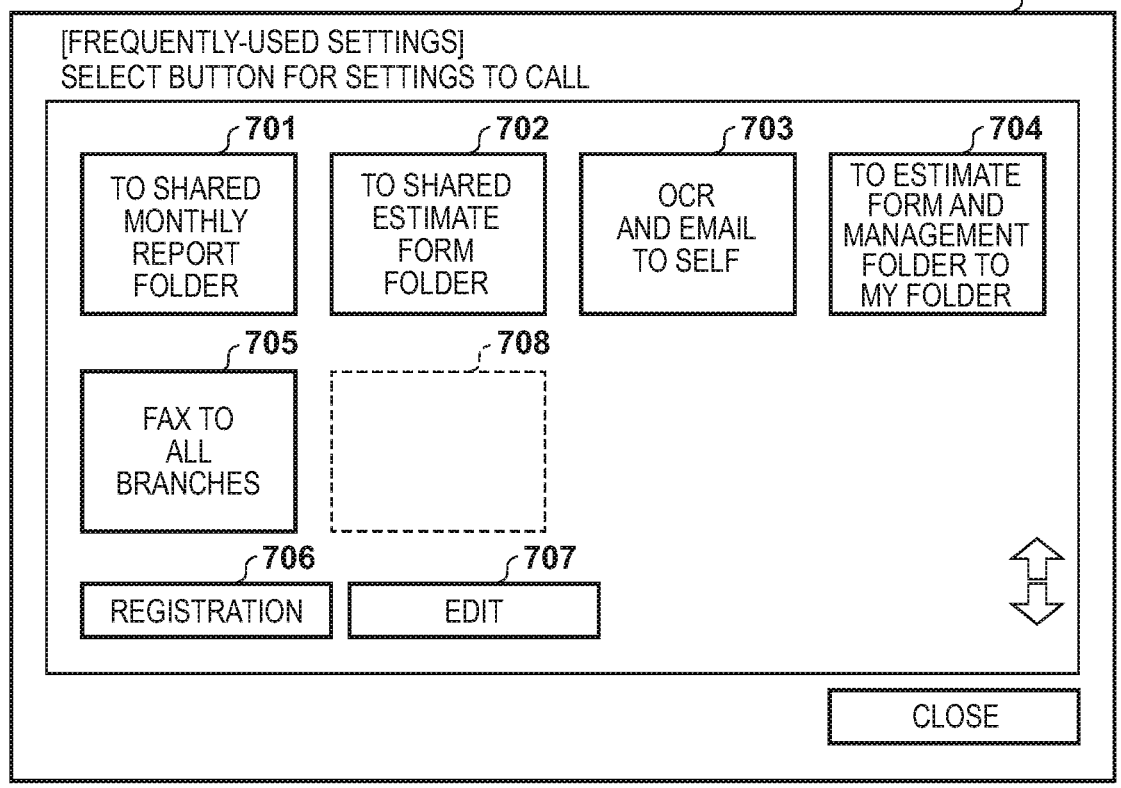
FIG. 7 depicts a view illustrating an example of a "frequently-used settings" screen which is displayed in the display unit of the console unit when a user presses a "frequently-used settings" button in FIG. 5.

FIG. 7 depicts a view illustrating an example of a "frequently-used settings" screen which is displayed in the display unit 401 of the console unit 105 when a user presses the "frequently-used settings" button 509 in FIG. 5.

In FIG. 7, a plurality of buttons 701-705 registered in "frequently-used settings" that the user registered, a registration button 706 that newly registers transmission settings of the current time, and an edit button 707 for editing an existing button are displayed. On this screen, a user can register, as a new button 708, a destination or a transmission setting that is set at that point in time by pressing the registration button 706. Also, it is possible to give an arbitrary name, which represents the saved destination and transmission setting content, to the new button 708. For example, an "OCR and email to self" button 703 is a button for setting the file format to PDF with OCR information and the transmission destination to an email address that is linked to the user who pressed the button 703.

Figure 8:
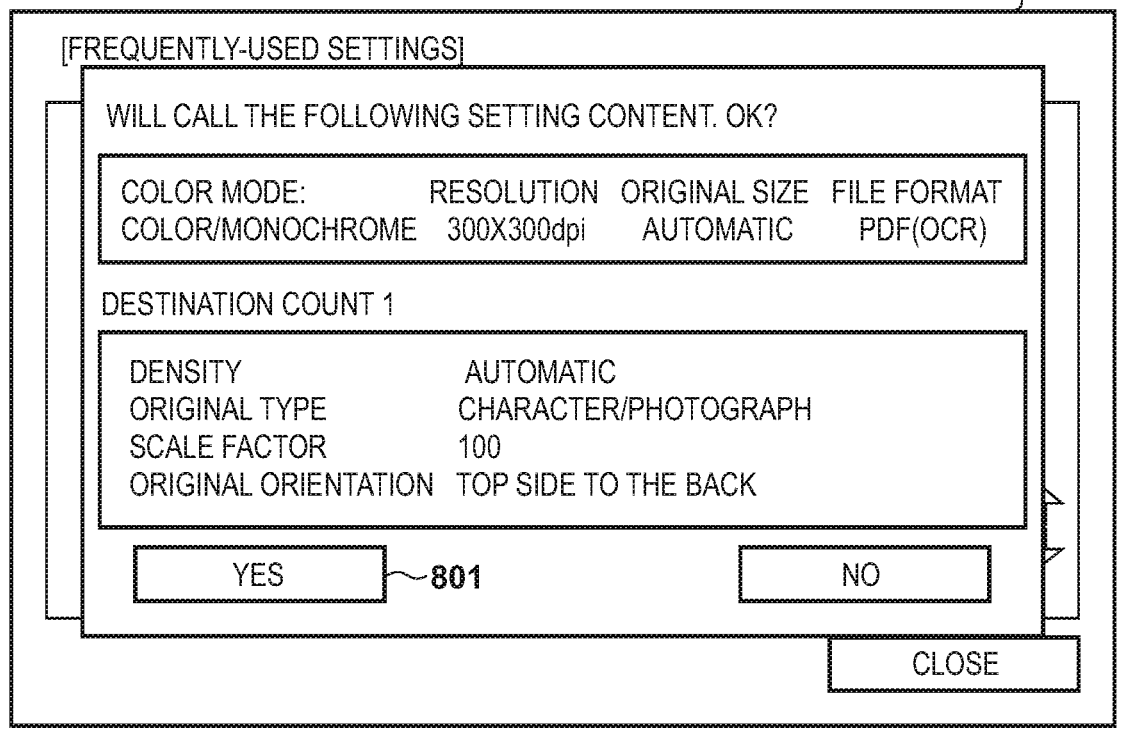
FIG. 8 depicts a view illustrating an example of a confirmation screen for displaying content of transmission settings which, after a user presses a "frequently-used settings" button in FIG. 5, are registered in association with that button.

FIG. 8 depicts a view illustrating an example of a confirmation screen for displaying of content of transmission settings which, after a user presses the "frequently-used settings" button 509 in FIG. 5, is registered in association with that button.

Figure 9:
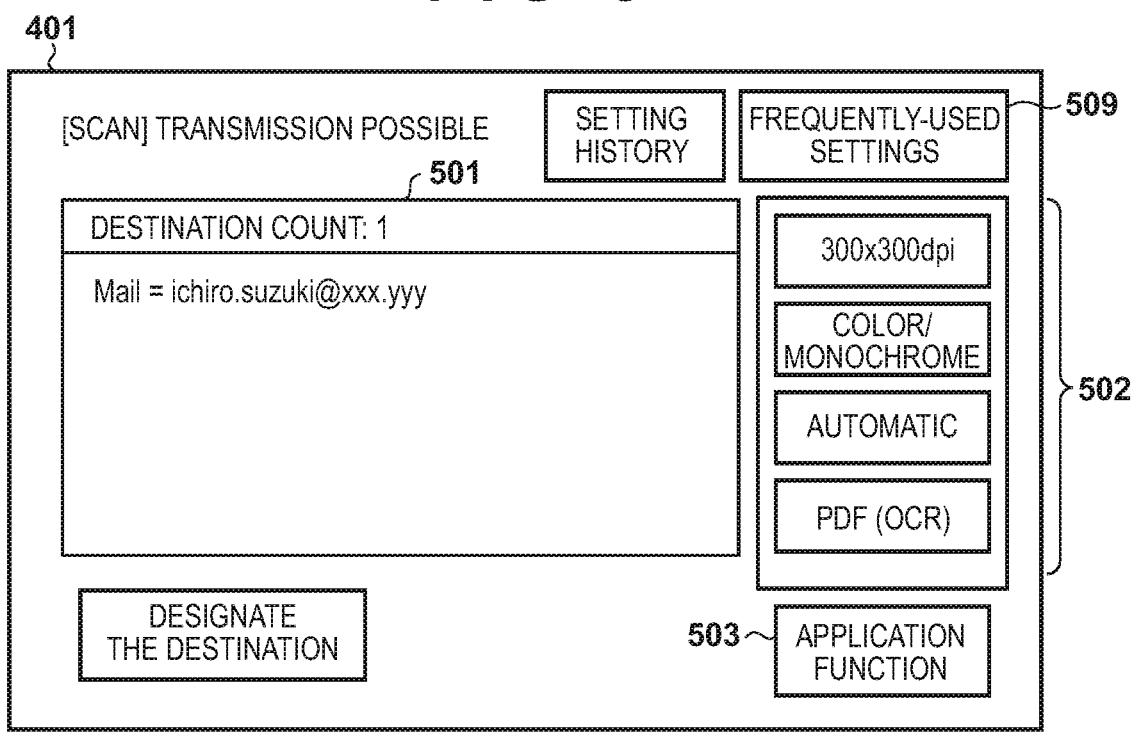
FIG. 9 depicts a view illustrating an example of an operation screen in which content called in FIG. 8 and registered in "frequently-used settings" is reflected as transmission settings for a scan transmission when a user presses a "yes" button in the screen of FIG. 8.

FIG. 9 depicts a view illustrating an example of an operation screen in which content called in FIG. 8 and registered in "frequently-used settings" is reflected as a transmission setting of a scan transmission when a user presses a "yes" button 801 in the screen of FIG. 8. Parts that are common to FIG. 5 are denoted by the same reference numerals in FIG. 9.

As will be clear from a comparison against FIG. 5, in FIG. 9, the scan color mode of the basic setting button 502 is changed to "color/monochrome" and the transmission file format is changed to PDF (OCR) in conformity with the settings of FIG. 8. Then, the email address registered with "frequently-used settings" is displayed in the destination specifying area 501.

Figure 10:
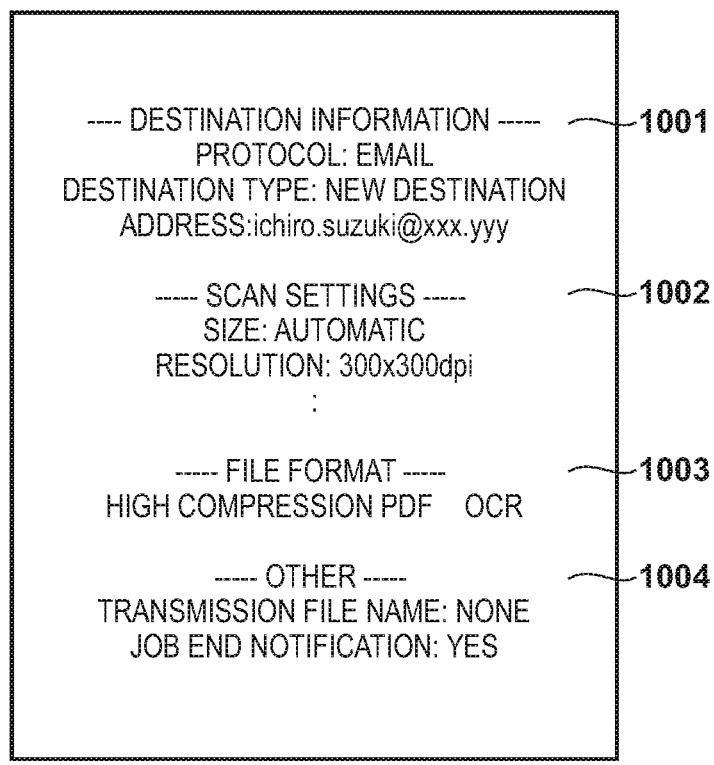
FIG. 10 depicts a view illustrating an example of information of "frequently-used settings" which is stored as a history in a storage unit when the transmission destination and the transmission settings are set on the screen of FIG. 9 and the scan transmission is performed.

FIG. 10 depicts a view illustrating information of "frequently-used settings" which is stored as a history in the storage unit 124 when the transmission destination and the transmission settings are set on the screen of FIG. 9 and a scan transmission is performed.

In destination information 1001, information according to a transmission protocol is saved. In this example, information necessary for transmitting to an email address which is a file transmission destination is saved. For a scan setting 1002, "auto-detect" scanning size and 300×300 dpi scan resolution are saved in correspondence with FIG. 9, in this example. Also, a file format 1003 is PDF and OCR. Also, other 1004 includes other settings such as a transmission file name, whether to make a job end notification, and the like.

Below, processing for making various settings necessary for transmission processing, such as transmission setting including setting a transmission destination and setting for scanning by the user, will be described.

Figure 11:
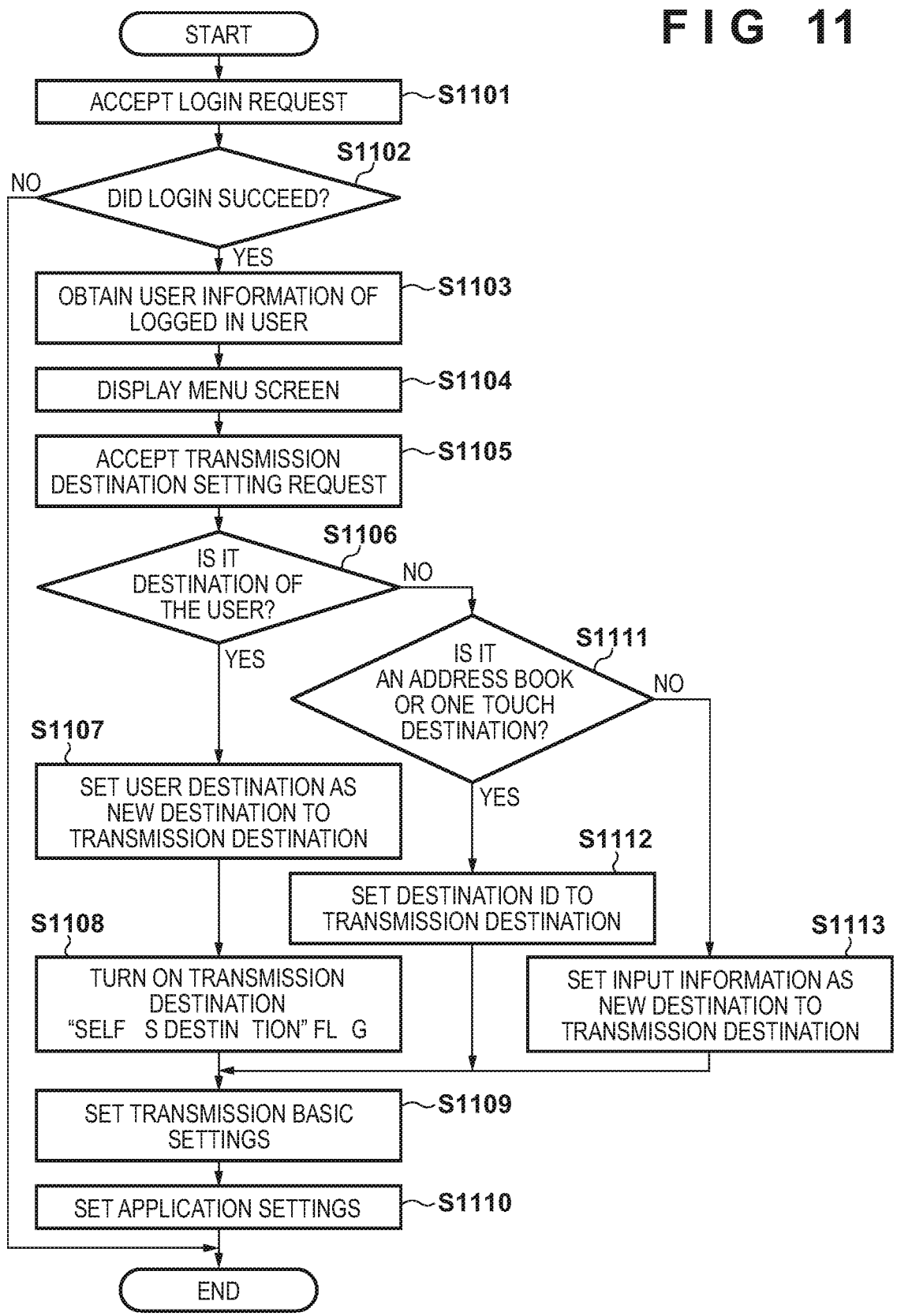
FIG. 11 is a flowchart for describing processing when a user logs in to the multi-function peripheral according to the first embodiment and registers a transmission destination and transmission settings.

FIG. 11 is a flowchart for describing processing when a user logs in to the multi-function peripheral 100 according to the first embodiment and registers a transmission destination and transmission settings. Note, this processing is achieved by the CPU 121 executing a program that the CPU 121 deployed to the RAM 123.

First, in step S1101, the CPU 121 accepts a user authentication request by the user causing card information including user authentication information to be read by using the card reader 111. Note that this user authentication request may be accepted by the user inputting a user name and password on a login screen displayed on the console unit 105. This is similar to the login request of the flowcharts described below. In step S1102, the CPU 121 references a user information database stored in the storage unit 124, and determines whether or not information of the user from whom the authentication request was accepted in step S1101 is registered in the database, in other words whether or not the user can use the multi-function peripheral 100. If the user is a user who is permitted to use the multi-function peripheral 100, the user login is permitted and step S1103 is advanced to, and when that is not the case, this processing ends.

In step S1103, the CPU 121 references the user information database registered in the storage unit 124, and obtains user information linked to the authenticated user. In this user information, a user name, an authority to operate the multi-function peripheral 100, an email address of the user, and folder information on a file server assigned to the user is included.

Next, the processing advances to step S1104, and the CPU 121 displays a menu screen such as is illustrated in FIG. 4, for example, and accepts an operation by the user on the console unit 105. Then, in step S1105, when a user selects a desired function (presses the scan button 407 of FIG. 4, for example) on this menu screen, the scan operation screen exemplified in FIG. 5 is displayed on the console unit 105, for example. Then, when a request to set the transmission destination for the image data obtained by scanning is accepted when the user presses one of the buttons of the destination specifying area 501, the processing advances from step S1105 to step S1106.

In step S1106, the CPU 121 determines whether or not a destination linked to the user was designated by the transmission destination setting request accepted in step S1105 by the "my folder" button 507 or the "email to self" button 508 being pressed. If the transmission destination is a destination linked to the user, the processing advances to step S1107, and if not, the processing advances to step S1111.

In step S1107, the CPU 121 obtains user destination information linked to the user, and uses the obtained destination information to generate a new destination, and sets it as the scan transmission destination. In other words, if the destination designation is in accordance with the "my folder" button 507 being pressed, for example, a folder of a file server assigned to the user is set as the transmission destination. Also, when the destination designation is in accordance with the "email to self" button 508 being pressed, an email address of the user himself or herself is designated as a transmission destination. Then the processing advances to step S1108, and the CPU 121 turns on a flag that indicates that the transmission destination set in step S1107 indicates "self as destination" which is linked to the user, stores that destination in the RAM 123, and advances the processing to step S1109.

Meanwhile, when it is determined in step S1106 that the designated destination is not a destination linked to the user, the processing advances to step S1111, and it is determined whether or not the transmission destination setting request received in step S1105 resulted from the user pressing the "address book" button 504 or the "one-touch" button 505. If so, the processing advances to step S1112, and the CPU 121 sets an ID for identifying the destination which is registered in the selected address book or one-touch setting as the transmission destination, and the processing advances to step S1109. Meanwhile, when it is determined in step S1111 that it is not a destination designation according to an address book or one-touch setting, the processing advances to step S1113. In such a case, the method for designating the transmission destination for the user is to input a new destination. Accordingly, the CPU 121 displays a transmission type selection screen (not shown) on the console unit 105, and displays a destination setting screen according to the transmission type that the user selected. Also, when a user inputs information that is required for each transmission type via the screen, a new destination is generated using the inputted information and set to the transmission destination, and the processing advances to step S1109.

In this way, in step S1109, the CPU 121 sets basic settings such as a scan resolution and a transmission file format that the user has set by the transmission basic setting button 502 as transmission settings. Then, the processing advances to step S1110, and the CPU 121 sets, to the transmission settings, detailed settings which are set by the user pressing the application function button 503, and completes various setting processes necessary for transmission.

Note that the login processing in step S1102 is assumed to reference the user information database that the multi-function peripheral 100 manages, but it may authenticate the user by querying an external authentication server based on information accepted in step S1101. This is similar in a login request of a flowchart described below.

Also, while it was described that the email address and the server folder information linked to the user are obtained from the user information database of the multi-function peripheral 100 in step S1103, they may be obtained from another database linked to information for identifying the user. Also, in a case where an external authentication server is used for logging in, email address and server folder information may be registered in user information on the server in advance, and obtained therefrom.

By this processing, a user who logged in assigns to the transmission destination a flag indicating that "self as destination" which is linked to the user when the job transmission destination is designated for a destination linked to the user. By this, at a time of registration to later-described "frequently-used settings", it is possible to make processing for setting by "self as destination" which is linked to the user different to a case of a normal transmission destination.

FIG. 12 is a flowchart for describing processing of the multi-function peripheral 100 for when a user registers the transmission settings which are set at that point in time as "frequently-used settings" in the multi-function peripheral 100 according to the first embodiment. Note, this processing is achieved by the CPU 121 executing a program that the CPU 121 deployed to the RAM 123.

First, in step S1201, when, in a state in which the screen illustrated in FIG. 9 is being displayed, for example, the CPU 121 accepts a press of the "frequently-used settings" button 509, the CPU 121 displays a "frequently-used settings" screen as is illustrated in FIG. 7, for example, on the console unit 105. Then, when the registration button 706 is pressed on that screen, the CPU 121 accepts a "frequently-used settings" registration request. Next, the processing advances to step S1202, and the CPU 121 sequentially reads out setting values for the transmission settings including in the transmission destination that are set at that point in time.

Next, in step S1203, the CPU 121 determines whether or not a setting value read out in step S1202 is a transmission destination. If not, the processing advances to step S1208, a transmission setting corresponding to the content of the basic setting button 502 that was read out is set as a "frequently-used settings" transmission setting, and the processing advances to step S1207.

Meanwhile, in step S1203, the CPU 121 advances the processing to step S1204 if a setting value that was read out is a transmission destination. In step S1204, the CPU 121 determines whether or not the transmission destination was set as a new destination. If so, the processing advances to step S1205, and the CPU 121 determines whether or not the transmission destination was set as "self as destination" linked to the user. Here, it is determined whether or not the flag indicating "self as destination" which was described in step S1108 of FIG. 11 is ON in the transmission destination. When the transmission determination is determined to be a "self as destination" setting, the processing advances to step S1206, and the CPU 121 saves, as the transmission destination, a definition value indicating "self as destination" linked to the user who performed the operation, and advances the processing to step S1207. Meanwhile, in step S1205, when it is determined that the transmission determination is not set to be a "self as destination", the processing advances to step S1209, and the CPU 121 determines the transmission destination to be a normal destination, and saves a character string such as a path to a file server or an email address that was designated, and the processing advances to step S1207.

Also, when the CPU 121, in step S1204, determines that the transmission destination is not a new destination, the CPU 121 advances the processing to step S1210. In such a case, because the destination is registered in an address book or a one-touch button, an ID (identifier) that identifies the address book or one-touch button destination that has been designated is saved as the transmission destination, and the processing advances to step S1207.

In step S1207, the CPU 121 determines whether or not all of the setting values for the transmission settings including the transmission destination that have been set at that point in time were read out and saved to "frequently-used settings". When it is determined here that not all of the settings have been saved, the processing advances to step S1202, and when it is determined that all of the settings have been saved, the processing ends.

By this processing, when the user registers transmission settings including the transmission destination to "frequently-used settings", it is possible to register the transmission destination in a form in which it can be identified that the transmission destination was designated by the user with "self as destination".

FIGS. 13A and 13B depict views for describing examples of destination information which is registered as "frequently-used settings" in the multi-function peripheral 100 according to the first embodiment.

In FIG. 13A, a transmission destination to which the definition value "USER_MAIL_ADDRESS" 1301 which indicates "self as destination" which is linked to the user is added as destination information has been set. Also, this destination is "<Alt id='DB_TYPE'> DIRECT_INPUT</Alt>" as denoted by 1302. This indicates that the address is a new destination rather than something that was designated by an address book or a one-touch button.

FIG. 13B illustrates an example in which a normal new destination is set as destination information.

An email address "User-A@mail.com" 1303 that was inputted here has been set as is to the transmission destination. Also, as denoted by reference numeral 1304, this destination is also "<Alt='DB_TYPE'>DIRECT_INPUT</Alt>", and it is indicated to be a new destination that was not designated by an address book or a one-touch button.

Note that when this destination is designated by an address book or a one-touch button, "DB_TYPE" will be "ADDRESS_BOOK" or "ONETOUCH" respectively.

Figure 14:
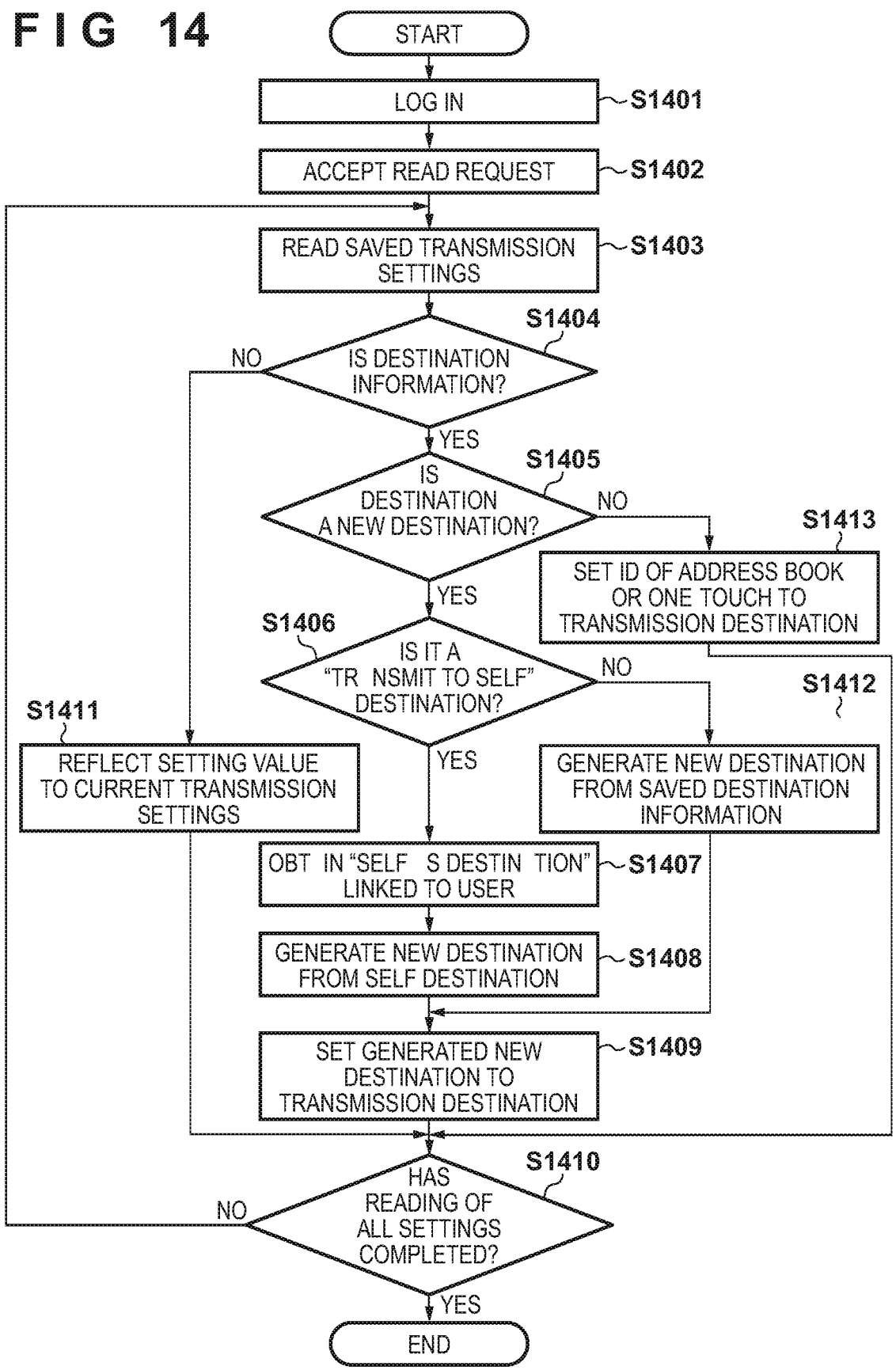
FIG. 14 is a flowchart for describing processing of the multi-function peripheral when settings such as a transmission destination are made using the "frequently-used settings" button in the multi-function peripheral according to the first embodiment.

FIG. 14 is a flowchart for describing processing of the multi-function peripheral 100 when a setting of a transmission destination or the like is made using the "frequently-used settings" button 509 in the multi-function peripheral 100 according to the first embodiment. Note, this processing is achieved by the CPU 121 executing a program that the CPU 121 deployed to the RAM 123.

First, in step S1401, when a user causes card information including user authentication information to be read by using the card reader 111, the CPU 121 performs user login processing based on the user information. Then, when the user logs in, the processing advances to step S1402, and the CPU 121 displays the menu screen illustrated in FIG. 4, for example, on the console unit 105 and accepts an operation by the user. Then, when the "scan" button 407 is pressed, for example, a screen such as is illustrated in FIG. 5, for example, is displayed. Then, when a press of the "frequently-used settings" button 509 is accepted on this screen, the processing advances to step S1403, and the CPU 121 reads information of "frequently-used settings" that the logged in user has registered from the storage unit 124.

Next, the processing advances to step S1404, and the CPU 121 determines whether or not the information of "frequently-used settings" read in step S1403 is destination information. If it is, the processing advances to step S1405, and if not, the processing advances to step S1411 since it is a transmission setting corresponding to the content of the basic setting button 502, the setting value of the transmission setting is reflected in the transmission settings of the processing to be executed, and the processing advances to step S1410.

In the case of destination information in step S1404, the processing advances to step S1405, and it is determined whether or not the destination information is a new destination. If it is a new destination, the processing advances to step S1406, and the CPU 121 determines whether or not the destination information was designated as "self as destination" which is linked to the user. Specifically, it is determined whether a definition value indicating "self as destination", specifically the "USER_MAIL_ADDRESS" 1301, has been set as the frequently-used settings destination information that has been saved. When it is determined that this definition value has been set, the processing advances to step S1407, and the CPU 121 obtains the destination information linked to the user. Then, the processing advances to step S1408, and the CPU 121 generates a new destination from the destination information linked to the user obtained in step S1407. Then, the processing advances to step S1409, and the CPU 121 sets the generated new destination to the transmission destination, and advances the processing to step S1410.

Also, when, in step S1406, the CPU 121 determines that the destination information is not "self as destination" linked to the user, the processing advances to step S1412, and since that destination information is a normal new destination, the CPU 121 generates a new destination based on the destination information, and the processing advances to step S1409. In step S1409, the CPU 121 sets the generated new destination to the transmission destination, and advances the processing to step S1410.

Also, when it is determined not to be a new destination in step S1405, the processing advances to step S1413 since the destination information is an address included in an address book or a one-touch button destination, the CPU 121 sets an ID that indicates the address book or one-touch button destination to the transmission destination, and the processing advances to step S1410.

In step S1410, the CPU 121 determines whether or not a transmission destination and other transmission settings that have been saved as "frequently-used settings" have all been reflected in the current transmission setting, and ends the processing when it determines that all have been reflected, and if not, returns the processing to step S1403.

By virtue of the first embodiment described above, in the case of a transmission destination that the user registered as a destination linked to self as "frequently-used settings", the destination is set to a destination linked to the user who called "frequently-used settings". By this, in the case where transmission settings for email transmission or file transmission, for example, are made by using "frequently-used settings", the transmission destination will be the destination of the user who called "frequently-used settings", and other settings will be in accordance with the contents that has been registered. Accordingly, there is the effect that each user can use common transmission settings by using "frequently-used settings", and can transmit to an intended transmission destination.

Second Embodiment

In the first embodiment as described above, an example in which a transmission destination linked to a user is recorded in a mode memory set as a transmission destination for a scan document, and is then called is described. Meanwhile, there is the desire to be able to notify a job end result not just to a transmission destination for a scanned document but also to a destination linked to a user. In such a case, if similar processing is performed for the notification destination, it ceases to be necessary to register as "frequently-used settings" for each user. In the second embodiment, an example of this is described. Note that the hardware configuration of the multi-function peripheral 100 according to the second embodiment is similar to that of the previously described first embodiment, and so explanation thereof is omitted.

Figure 15:
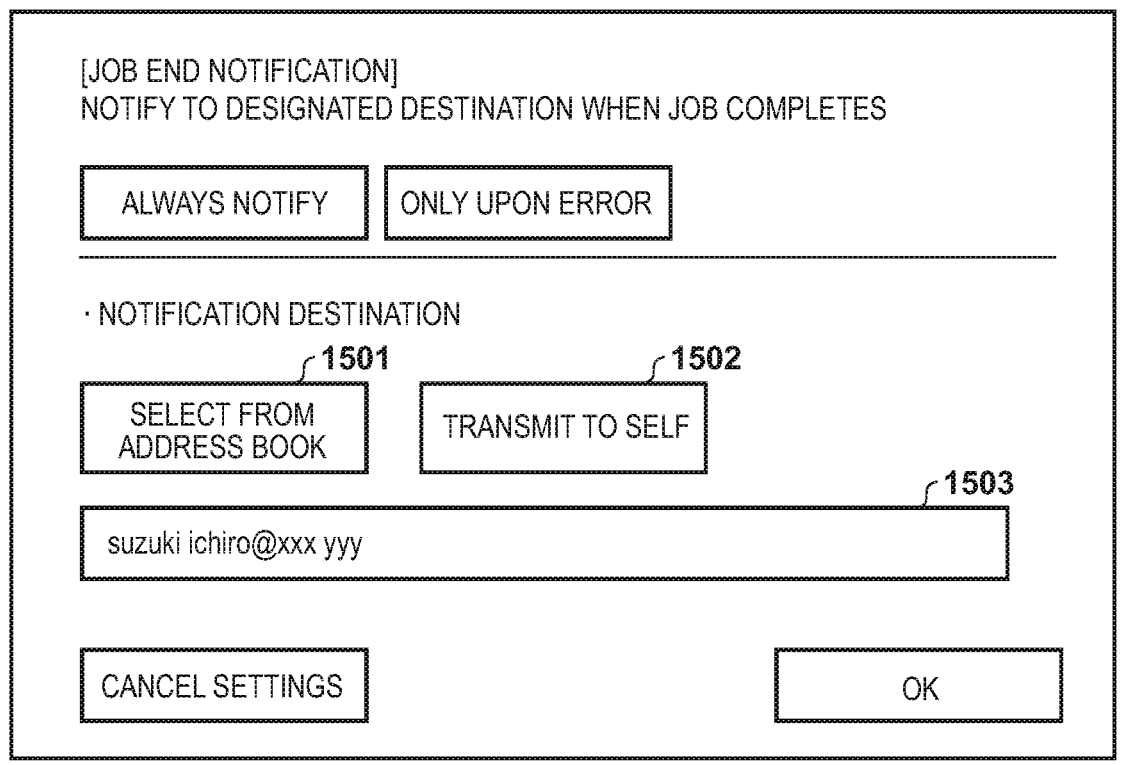
FIG. 15 depicts a view illustrating an example of a setting screen of a job end notification that is displayed in a console unit of the multi-function peripheral according to a second embodiment.

FIG. 15 depicts a view illustrating an example of a setting screen of a job end notification that is displayed on the console unit 105 of the multi-function peripheral 100 according to the second embodiment. This job end setting screen is a screen on which the user designates a notification destination to which to notify the result of a job that the multi-function peripheral 100 executed.

A button 1501 is a "select from address book" button for selecting a notification destination for an end notification from an address book. Also, a button 1502 is a "transmit to self" button that makes an email address linked to the user a notification destination for a job end notification. The notification destination set here is displayed in a notification destination display area 1503, and in this example, the email address "suzuki.ichiro@xxx.yyy" is being displayed.

Figure 16:
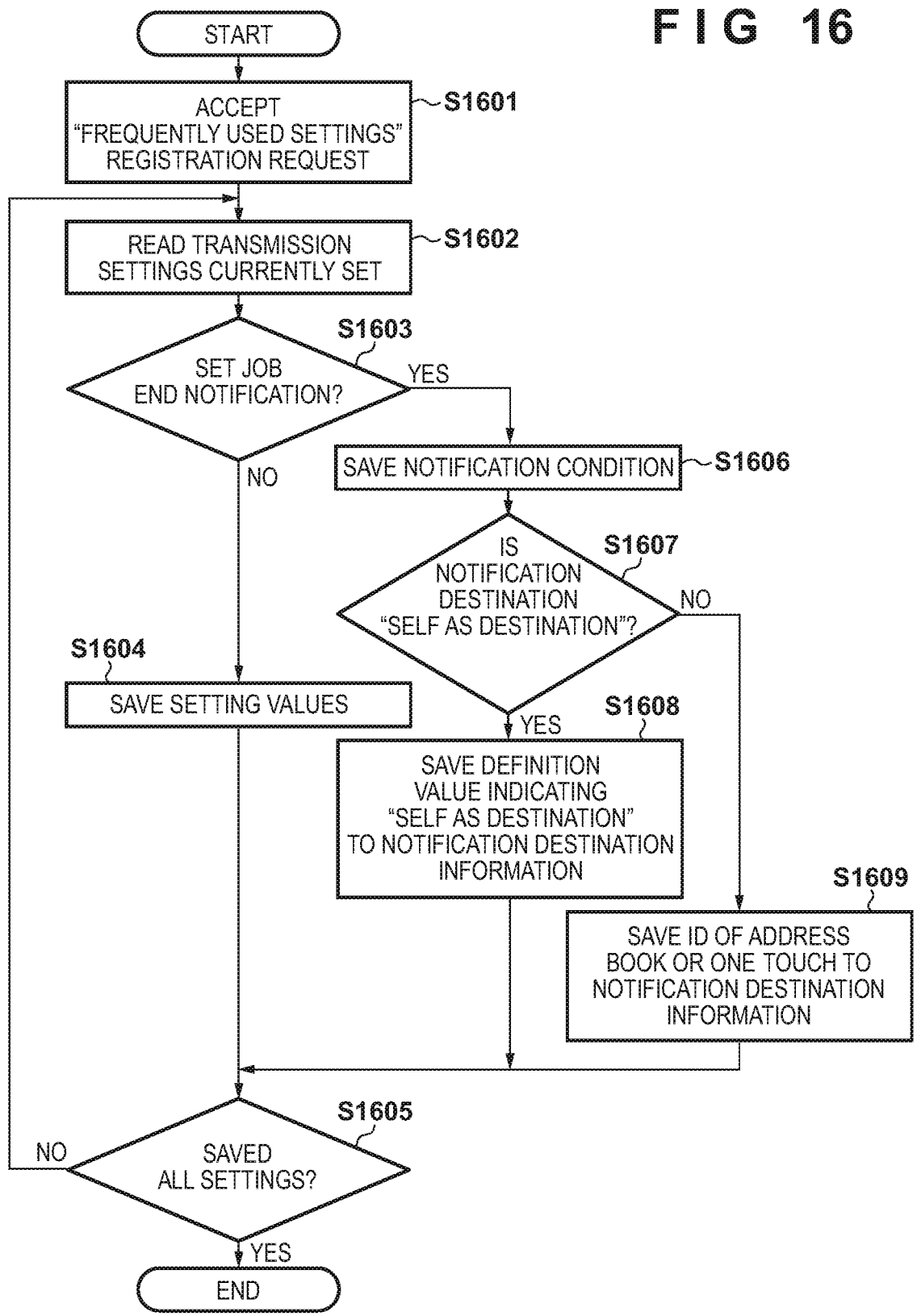
FIG. 16 is a flowchart for describing processing of the multi-function peripheral for when a user sets a notification condition and a notification destination of the job end notification as "frequently-used settings" in the multi-function peripheral according to the second embodiment.

FIG. 16 is a flowchart for describing processing of the multi-function peripheral 100 for when a user sets a notification condition and a notification destination of the job end notification as "frequently-used settings" in the multi-function peripheral 100 according to the second embodiment. Note, this processing is achieved by the CPU 121 executing a program that the CPU 121 deployed to the RAM 123.

Prior to the start of this processing, the user presses the application function button 503 on the scan operation screen of FIG. 5, for example, and a setting screen for the job end notification illustrated in FIG. 15 is displayed. When the user on this setting screen designates a notification condition for the job end notification, and the notification destination, and presses the OK button, the screen of FIG. 5 is returned to. Then, when, on the scan operation screen of FIG. 5, the "frequently-used settings" button 509 is pressed, the "frequently-used settings" screen of FIG. 7 opens, and when the registration button 706 is pressed there, a transmission setting in which the job end notification is set is saved as "frequently-used settings". With this, the flowchart of FIG. 16 is started.

Firstly, when the user presses the registration button 706, the CPU 121, in step S1601, accepts a request to save the transmission settings at that point in time to "frequently-used settings". Next, the processing advances to step S1602, and the CPU 121 reads setting values for the transmission settings for which the save request was accepted in step S1601. Then, the processing advances to step S1603, and the CPU 121 determines whether or not the setting content is a job end notification. When it is not the job end notification setting, the processing advances to step S1604, and the transmission destination and the like are saved in a predetermined area for "frequently-used settings" in a format according to the setting content of the read setting values, and the processing advances to step S1605.

Meanwhile, when the CPU 121, in step S1603, determines that the setting content is the job end notification setting, the processing advances to step S1606, and a job end notification condition is saved in the predetermined area for "frequently-used settings". Then, the processing advances to step S1607, and the CPU 121 determines whether or not the notification destination was designated by the "transmit to self" button 1502 being pressed. If so, the processing advances to step S1608, and the CPU 121 saves a definition value indicating "self as destination" which is linked to the user as the notification destination information in the predetermined area for "frequently-used settings" as the notification destination for the job end notification, and the processing advances to step S1605.

Also, in step S1607, when the CPU 121 determines that the notification destination was not set by the "transmit to self" button 1502 being pressed, the processing advances to step S1609. In step S1609, since the notification destination is something that is selected from an address book or a one-touch button, the CPU 121 saves in "frequently-used settings" an ID for identifying the address book or one-touch button as the notification destination for the job end notification. Then the processing advances to step S1605.

In step S1605, the CPU 121 determines whether or not all of the transmission settings read in step S1602 were saved to "frequently-used settings", and when all settings have not yet been saved, the processing returns to step S1602, and when all settings have been saved, the processing ends.

Accordingly, when the job end notification communication destination registered in "frequently-used settings" is designated by pressing the "transmit to self" button 1502, it is possible to register the communication destination assigning a definition value indicating "self as destination" thereto.

Figure 17:
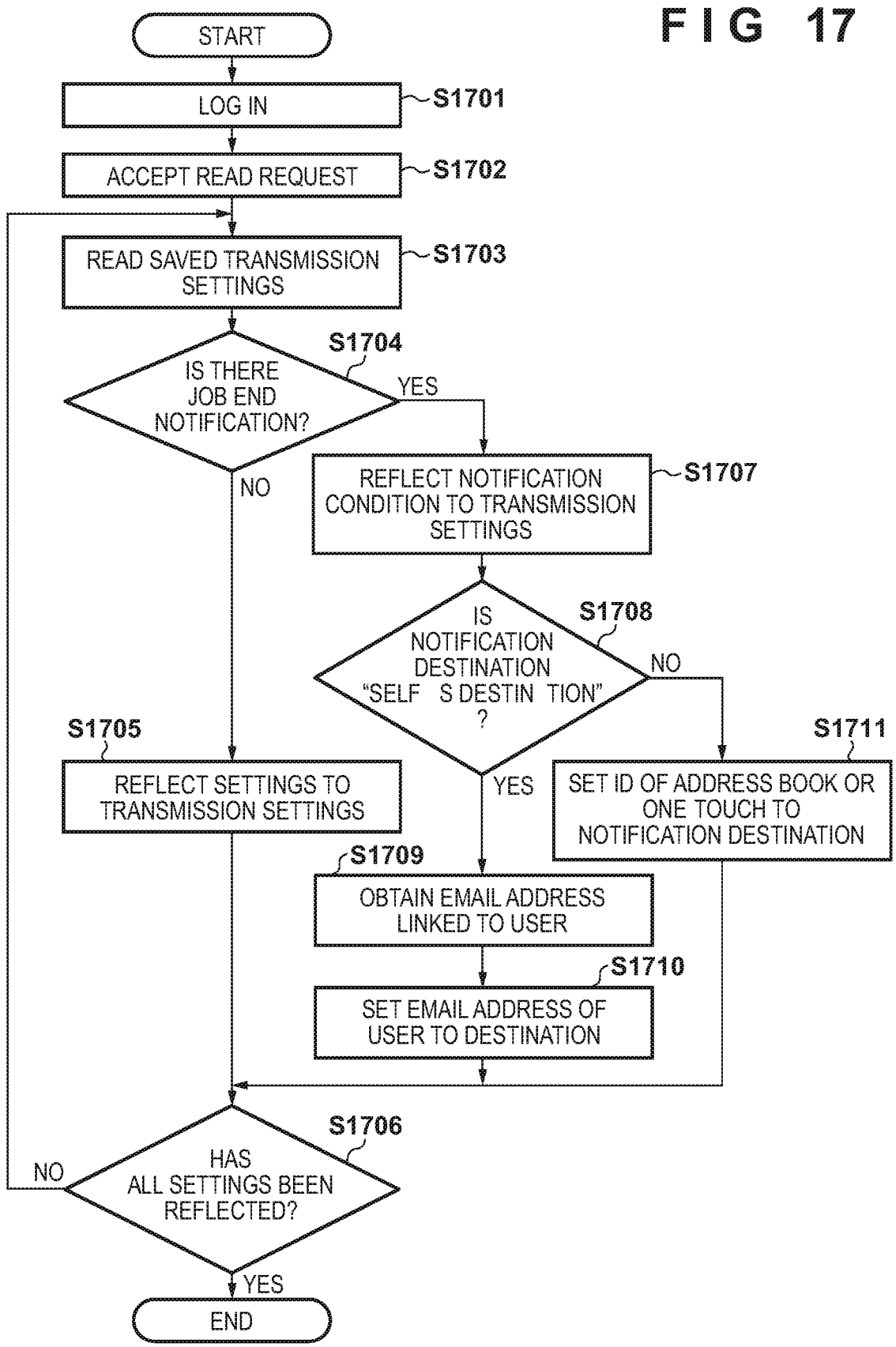
FIG. 17 is a flowchart for describing processing in which "frequently-used settings", which include the registered job end notification setting, are read using the "frequently-used settings" button and are reflected in a notification destination in the multi-function peripheral according to the second embodiment.

FIG. 17 is a flowchart for describing processing in which "frequently-used settings", which include the registered job end notification setting, are read using the "frequently-used settings" button 509 and are reflected in a notification destination in the multi-function peripheral 100 according to the second embodiment. Note, this processing is achieved by the CPU 121 executing a program that the CPU 121 deployed to the RAM 123.

First, in step S1701, when a user causes card information including user authentication information to be read by using the card reader 111, the CPU 121 performs user login processing based on the user information. Then, when the user logs in, the processing advances to step S1702, and the CPU 121 displays a menu screen on the console unit 105, accepts a user operation, and displays a screen such as is illustrated in FIG. 5, for example. Then, when a press of the "frequently-used settings" button 509 on this screen is accepted, the processing proceeds to step S1703, the CPU 121 reads information of "frequently-used settings" that the user who is logged in has registered from the storage unit 124.

Next, the processing advances to step S1704, and the CPU 121 determines whether or not the setting content read in step S1703 is a job end notification. When the setting content read in step S1703 is not a job end notification, the processing advances to step S1705, and the CPU 121 sets the read out setting as the transmission settings to be reflected to the current transmission settings and transmission destination, and the processing advances to step S1706.

Meanwhile, when, in step S1704, the transmission settings read out in step S1703 are determined to be related to a job end notification, the processing advances to step S1707, and the notification condition for the job end notification of the transmission settings read out in step S1703 is reflected in the current transmission settings. Next, the processing advances to step S1708, and the CPU 121 determines whether or not the definition value indicating "self as destination" has been added to the notification destination for the job end notification of the transmission setting read out in step S1703, specifically whether or not the notification destination was set by "transmit to self" which is a destination linked to the user. If so, the processing advances to step S1709, and the CPU 121 obtains the email address linked to the user. Then, the processing advances to step S1710, and the CPU 121 sets the obtained email address to the job end notification destination, and the processing advances to step S1706. Also, when a definition value indicating "self as destination" has not been added to the notification destination in step S1708, the processing proceeds to step S1711, and the CPU 121 sets an ID of the address book or one-touch button that was read in step S1703 to the notification destination for the job end notification, and the processing advances to step S1706.

In step S1706, the CPU 121 determines whether or not all of the transmission settings read in step S1703 were reflected in the transmission settings, and when all of the settings have been reflected, the CPU 121 ends the processing, and otherwise, the processing returns to step S1703.

As described above, by virtue of the second embodiment, in a case where notification destination information, for which a user designated a destination linked to self as a notification destination for a job end notification, is called, the destination linked to the user who performed the call operation is set as the notification destination for the job end notification.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-193821, filed Oct. 3, 2017, which is hereby incorporated by reference herein in its entirety.

What is claimed is:

1. A communication apparatus including a function for authenticating a user, comprising:
a memory device that stores a set of instructions; and
at least one processor that executes the instructions stored in the memory to:
in a case where an authenticated user authenticated by using the function designates a destination linked to self as a transmission destination, set the destination linked to self as the transmission destination;
in a case where an input is received using a destination setting screen by the authenticated user, set a destination corresponding to the input as the transmission destination;
determine, in a case where the transmission destination is registered, whether or not the transmission destination was set in accordance with the authenticated user having designated the destination linked to self;
register, in a case where the transmission destination was set in accordance with the authenticated user having designated the destination linked to self, a first transmission setting including first information indicating that the transmission destination was designated by designation of the destination linked to self;
register, in a case where the transmission destination was set in accordance with the input using the destination setting screen, a second transmission setting including the destination corresponding to the input; and
in a case where another user is authenticated by using the function and a read instruction for the registered first transmission setting is accepted from the another user, set, as a new transmission destination according to the first information, a destination linked to the another user, who performed the read instruction.

2. The communication apparatus according to claim 1, further comprising:
a storage unit configured to store user information,
wherein the function authenticates the user based on the user information stored in the storage unit and user information inputted by the user.

3. The communication apparatus according to claim 1, wherein the function transmits to a server user information inputted by the user and authenticates the user based on information from the server.

4. The communication apparatus according to claim 1, wherein, upon setting the destination linked to self as the transmission destination, the at least one processor executes the instructions to, in accordance with the user making an instruction on an icon or a button for designating the destination linked to self which is being displayed on a screen, set the destination linked to the user as the transmission destination and also add second information indicating designation of the destination linked to self to the transmission destination.

5. The communication apparatus according to claim 4, wherein, upon registering the first transmission setting, the at least one processor executes the instructions to register the first transmission setting to which the second information has been added together with the first information which indicates that the transmission destination was designated by designation of the destination linked to self.

6. The communication apparatus according to claim 1, wherein the destination linked to self is an email address of the user.

7. The communication apparatus according to claim 1, wherein the destination linked to self is a path to a folder of a file server that is assigned to the user.

8. The communication apparatus according to claim 1, wherein the first transmission setting includes at least one of a resolution of image data, a color mode, and a file format, wherein the at least one processor executes the instructions to further, in accordance with the read instruction for the first transmission setting, transmit image data that is processed in accordance with the first transmission setting to the new transmission destination.

9. The communication apparatus according to claim 1, wherein, upon registering the first transmission setting, the at least one processor executes the instructions to register the first transmission setting as "frequently-used settings",
wherein the read instruction for the first transmission setting is performed by an instruction being made on a button on a screen associated with the "frequently-used settings".

10. A communication apparatus including a function for authenticating a user, the communication apparatus comprising:
a memory device that stores a set of instructions; and
at least one processor that executes the instructions stored in the memory to:
designate a notification destination to which to notify a result of an executed job;
in a case where an authenticated user authenticated by using the function designates a destination linked to self as the notification destination, set the destination linked to self as the notification destination;
in a case where an input is received using a destination setting screen by the authenticated user, set a destination corresponding to the input as the notification destination;
determine, in a case where the notification destination is registered, whether or not the notification destination was set in accordance with the authenticated user having designated the destination as linked to self;
register, register, in a case where the notification destination was set in accordance with the authenticated user having designated the destination as linked to self, a first notification setting including first information indicating that the notification destination was designated by designation of the destination linked to self;
register, in a case where the notification destination was set in accordance with the input using the destination setting screen, a second notification setting including the destination corresponding to the input; and
in a case where another user is authenticated by using the function and a read instruction for the registered first notification setting is accepted from the another user, set, as a new notification destination according to the first information, a destination linked to the another user, who performed the read instruction.

11. The communication apparatus according to claim 10, further comprising:
a storage unit configured to store user information,
wherein the function authenticates the user based on the user information stored in the storage unit and user information inputted by the user.

12. The communication apparatus according to claim 10, wherein the function transmits to a server user information inputted by the user and authenticates the user based on information from the server.

13. The communication apparatus according to claim 10, wherein, upon setting the destination linked to self as the notification destination, the at least one processor executes the instructions to, in accordance with the user making an instruction on an icon or a button for designating the destination linked to self which is being displayed on a screen, set the destination linked to the user as the notification destination and also add second information indicating designation of the destination linked to self to the notification destination.

14. The communication apparatus according to claim 13, wherein, upon registering the first notification setting, the at least one processor executes the instructions to register the first notification setting to which the second information has been added together with the first information which indicates that the notification destination was designated by designation of the destination linked to self.

15. The communication apparatus according to claim 10, wherein the destination linked to self is an email address of the user.

16. A method of controlling a communication apparatus including a function for authenticating a user, the method comprising:
in a case where an authenticated user authenticated by using the function designates a destination linked to self as a transmission destination, setting the destination linked to self as the transmission destination;
in a case where an input is received using a destination setting screen by the authenticated user, setting a destination corresponding to the input as the transmission destination;
determining, in a case where the transmission destination is registered, whether or not the transmission destination was set in accordance with the authenticated user having designated the destination linked to self;
registering, in a case where the transmission destination was set in accordance with the authenticated user having designated the destination lined to self, a first transmission setting including first information indicating that the transmission destination was designated by designation of the destination linked to self;
registering, in a case where the transmission destination was set in accordance with the input using the destination setting screen, a second transmission setting including the destination corresponding to the input; and
in a case where another user is authenticated by using the function and a read instruction for the registered first transmission setting is accepted from the another user, setting as a new transmission destination according to the first information, a destination linked to the another user, who performed the read instruction.

17. A method of controlling a communication apparatus including a function for authenticating a user, the method comprising:
designating a notification destination to which to notify a result of an executed job;
in a case where an authenticated user authenticated by using the function designates a destination linked to self as the notification destination, setting the destination linked to self as the notification destination;
in a case where an input is received using a destination setting screen by the authenticated user, setting a destination corresponding to the input as the notification destination;
determining, in a case where the notification destination is registered, whether or not the notification destination was set in accordance with the authenticated user having designated the destination linked to self;
registering, in a case where the notification destination was set in accordance with the authenticated user having designated the destination linked to self, a first notification setting including first information indicating that the notification destination was designated by designation of the destination linked to self;

registering, in a case where the notification destination was set in accordance with the input using the destination setting screen, a second notification setting including the destination corresponding to the input; and in a case where another user is authenticated by using the function and a read instruction for the registered first notification setting is accepted from the another user, setting, as a new notification destination according to the first information, a destination linked to the another user, who performed the read instruction.

18. A non-transitory computer-readable storage medium storing a program for causing a processor to execute a method of controlling a communication apparatus including a function for authenticating a user, the method comprising:

in a case where an authenticated user authenticated by using the function designates a destination linked to self as a transmission destination, setting the destination linked to self as the transmission destination;

in a case where an input is received using a destination setting screen by the authenticated user, setting a destination corresponding to the input as the transmission destination;

determining, in a case where the transmission destination is registered, whether or not the transmission destination was set in accordance with the authenticated user having designated the destination linked to self;

registering, in a case where the transmission destination was set in accordance with the authenticated user having designated the destination lined to self, a first transmission setting including first information indicating that the transmission destination was designated by designation of the destination linked to self;

registering, in a case where the transmission destination was set in accordance with the input using the destination setting screen, a second transmission setting including the destination corresponding to the input; and in a case where another user is authenticated by using the function and a read instruction for the registered first transmission setting is accepted from the another user, setting as a new transmission destination according to the first information, a destination linked to the another user, who performed the read instruction.

19. A non-transitory computer-readable storage medium storing a program for causing a processor to execute a method of controlling a communication apparatus including a function for authenticating a user, the method comprising:

designating a notification destination to which to notify a result of an executed job;

in a case where an authenticated user authenticated by using the function designates a destination linked to self as the notification destination, setting the destination linked to self as the notification destination;

in a case where an input is received using a destination setting screen by the authenticated user, setting a destination corresponding to the input as the notification destination;

determining, in a case where the notification destination is registered, whether or not the notification destination was set in accordance with the authenticated user having designated the destination linked to self;

registering, in a case where the notification destination was set in accordance with the authenticated user having designated the destination linked to self, a first notification setting including first information indicating that the notification destination was designated by designation of the destination linked to self;

registering, in a case where the notification destination was set in accordance with the input using the destination setting screen, a second notification setting including the destination corresponding to the input; and in a case where another user is authenticated by using the function and a read instruction for the registered first notification setting is accepted from the another user, setting, as a new notification destination according to the first information, a destination linked to the another user, who performed the read instruction.

* * * * *